United States Patent
Rautenberg

(10) Patent No.: US 10,677,757 B2
(45) Date of Patent: Jun. 9, 2020

(54) METHOD FOR ACOUSTICALLY DETERMINING PROPERTIES OF A MEDIUM, AND DEVICE FOR ACOUSTICALLY DETERMINING PROPERTIES OF A MEDIUM, COMPRISING A REFLECTIVE ELEMENT

(71) Applicant: SENSACTION AG, Coburg (DE)

(72) Inventor: Jens Rautenberg, Coburg (DE)

(73) Assignee: SENSACTION AG, Coburg (DE)

(*) Notice: Subject to any disclaimer, the term of this patent is extended or adjusted under 35 U.S.C. 154(b) by 59 days.

(21) Appl. No.: 16/072,131

(22) PCT Filed: Jan. 24, 2017

(86) PCT No.: PCT/EP2017/051447
§ 371 (c)(1),
(2) Date: Jul. 23, 2018

(87) PCT Pub. No.: WO2017/125613
PCT Pub. Date: Jul. 27, 2017

(65) Prior Publication Data
US 2019/0033260 A1    Jan. 31, 2019

(30) Foreign Application Priority Data
Jan. 24, 2016   (DE) .......................... 10 2016 200 947

(51) Int. Cl.
*G01N 29/02* (2006.01)
*G01N 29/024* (2006.01)
(Continued)

(52) U.S. Cl.
CPC ......... *G01N 29/024* (2013.01); *G01N 29/022* (2013.01); *G01N 29/222* (2013.01);
(Continued)

(58) Field of Classification Search
CPC .......... G01N 29/02; G01N 29/22; G01F 1/66
See application file for complete search history.

(56) References Cited

U.S. PATENT DOCUMENTS 4,300,401 A   11/1981   Pedersen
4,735,097 A   4/1988    Lynnworth
(Continued)

FOREIGN PATENT DOCUMENTS

DE          195 03 714 A1    8/1996
DE   10 2009 048 646 A1     3/2011
(Continued)

OTHER PUBLICATIONS

Jackson, G.A., et al., "A three-path ultrasonic flowmeter for small-diameter pipelines," vol. 22, pp. 645-650 (1989).
(Continued)

*Primary Examiner* — Jewel V Dowtin
(74) *Attorney, Agent, or Firm* — Maschoff Brennan

(57) ABSTRACT

The invention relates in particular to a method for determining physical, chemical, and/or biological properties of a medium (M) located in the interior (30) of a waveguide (3) using at least one acoustic wave which has propagated at least partly through the medium (M). According to the invention, a first wall section (31a) and a second wall section (31b) of the waveguide (3) are connected together via a connection piece (31c) such that a second surface wave (OW2) propagates to the first wall section (31a) at least partly via the connection piece (31c). One of the wall sections (31a, 31b) and/or the connection piece (31c) is provided with at least one reflective element (4) on which at least one pert of a: least one first surface wave (OW1) that is excited on the first wall section (31a) by incurs of a transmitter (SE) is reflected ss a third surface wave (OW1'). A receiver (SE) is used to receive second and third surface waves (OW2, OW1') on the first wall section (31a), and the
(Continued)

second and third surface waves are used to determine physical, chemical, and/or biological properties of the medium (M).

21 Claims, 1 Drawing Sheet

(51) Int. Cl.
*G01N 29/22* (2006.01)
*G01N 29/24* (2006.01)
*G10K 11/28* (2006.01)
*G01H 5/00* (2006.01)

(52) U.S. Cl.
CPC ........... *G01N 29/2462* (2013.01); *G01H 5/00* (2013.01); *G01N 2291/011* (2013.01); *G01N 2291/021* (2013.01); *G01N 2291/022* (2013.01); *G01N 2291/045* (2013.01); *G01N 2291/0423* (2013.01); *G01N 2291/0426* (2013.01); *G01N 2291/0427* (2013.01); *G01N 2291/0428* (2013.01); *G01N 2291/101* (2013.01); *G10K 11/28* (2013.01)

(56) References Cited

U.S. PATENT DOCUMENTS

| | | | |
|---|---|---|---|
| 4,838,127 A | 6/1989 | Herremans et al. | |
| 6,378,377 B2* | 4/2002 | Matuseski | B64D 15/20 340/582 |
| 6,513,365 B1 | 2/2003 | Bruetting et al. | |
| 8,234,934 B2 | 8/2012 | Dietz et al. | |
| 9,581,572 B2* | 2/2017 | Koenig | G01N 29/221 |
| 10,281,315 B2* | 5/2019 | Lenner | G01F 23/2968 |
| 2015/0260561 A1* | 9/2015 | Twerdowski | G01N 29/2412 73/861.18 |

FOREIGN PATENT DOCUMENTS

| | | |
|---|---|---|
| DE | 10 2011 119 673 A1 | 4/2013 |
| DE | 102012019217 A1 | 4/2014 |
| DE | 10 2014 106 706 A1 | 12/2014 |
| EP | 2 072 972 A1 | 6/2009 |
| EP | 2 343 548 A2 | 7/2011 |
| EP | 2 386 835 A1 | 11/2011 |
| EP | 2343548 B1 * | 12/2017 |
| WO | 9857163 A1 | 12/1998 |
| WO | 00/64737 | 11/2000 |
| WO | 2008/034878 A2 | 3/2008 |
| WO | 2015/096901 A1 | 7/2015 |

OTHER PUBLICATIONS

Jackson, G.A., et al., "A three-path ultrasonic flow meter with fluid velocity profile identification," vol. 22, pp. 635-642 (1991).
EP Office Action in application No. 17 705 026.7 dated Aug. 6, 2019.

* cited by examiner

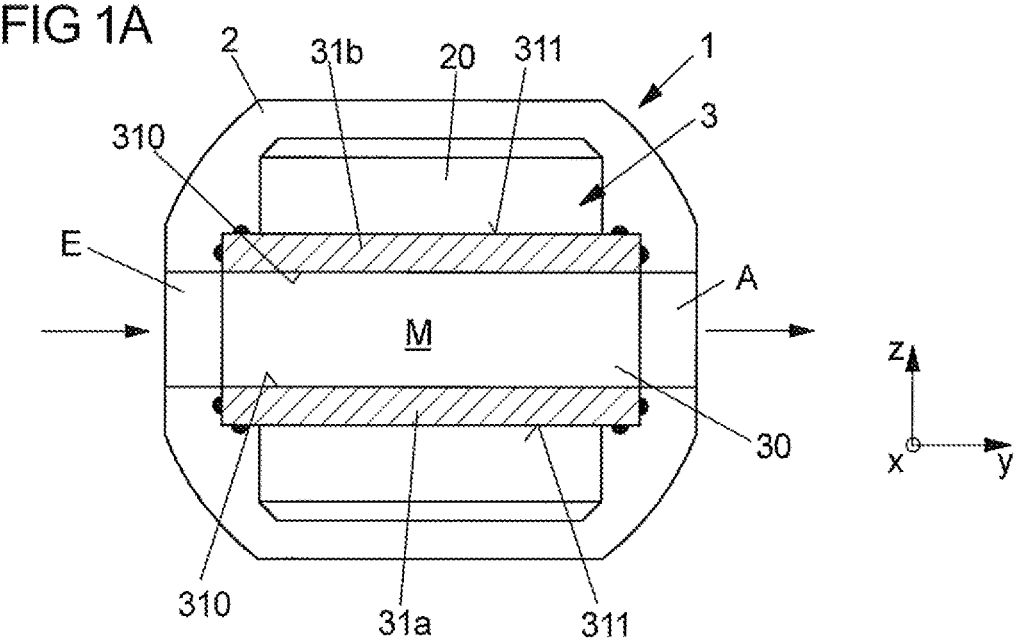
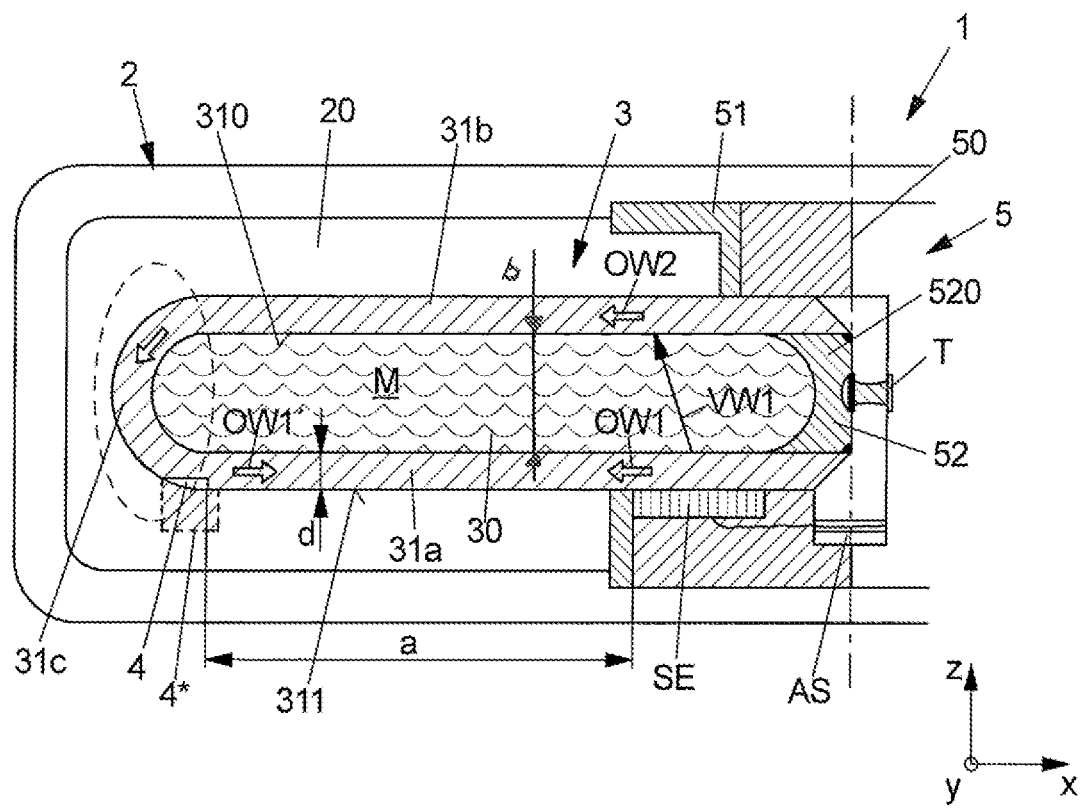

METHOD FOR ACOUSTICALLY DETERMINING PROPERTIES OF A MEDIUM, AND DEVICE FOR ACOUSTICALLY DETERMINING PROPERTIES OF A MEDIUM, COMPRISING A REFLECTIVE ELEMENT

CROSS-REFERENCE TO A RELATED APPLICATION

This application is a National Phase Patent Application of International Patent Application Number PCT/EP2017/051447, filed on Jan. 24, 2017, which claims priority of German Patent Application 10 2016 200 947.8, filed on Jan. 24, 2016.

BACKGROUND

The present invention relates to a method for determining physical and/or chemical properties of a medium and an apparatus for determining physical, chemical and/or biological properties of a medium.

The medium whose physical and/or chemical and/or biological properties are to be determined by a generic method is a gas or, preferably, a liquid or a soft material, in particular a highly viscous, dough-like or pasty medium. The acoustic waves used to determine the properties are ultrasonic waves, for example, which are produced by an appropriate transmitter by way of a transmission signal.

In a known method for determining physical, chemical and/or biological properties of the medium, at least two acoustic waves, for example, are produced by a transmission signal, said acoustic waves propagating at least partly through the medium along identical or different propagation directions before they are each received at a receiver lying in the respective propagation direction. By way of example, in a flowing medium, acoustic waves are produced along a first propagation direction in the flow direction of the medium on the one hand and along a second propagation direction counter to the flow direction of the medium on the other hand. Then, a time-of-flight difference can be established from the reception signals generated at the respective receivers and this can be used to deduce the (mean) flow speed of the medium, for example. If, as an alternative or in addition thereto, absolute times of flight of an acoustic wave from a transmitter to a receiver are still established with the aid of the reception signals, it is possible to draw further conclusions about physical, chemical and/or biological properties of the medium, such as the density, temperature or composition thereof, for example.

WO 2008/034878 A2 has disclosed an apparatus in which acoustic surface waves are produced, said surface waves coupling volume acoustic waves into the respective medium in a waveguide. By repeatedly output coupling surface waves at the sites at which the volume acoustic wave strikes a wall surrounding the medium, acoustic surface waves are received at a receiver in turn, the times of flight and time-of-flight differences of said surface waves being characteristic for the medium and the physical, chemical and/or biological properties thereof.

Apart from that, there are ultrasonic methods for measuring the sound speeds in fluids, whether by a direct beam method or else by means of leaky Lamb wave based systems. The advantage of the leaky Lamb wave systems lies in the great robustness in relation to dispersing particles or bubbles since, in comparison with the direct beam method, there is a significantly higher chance of components of the emitted sound packet also reaching the receiver. In addition to the sound speed, the temperature and, in particular, the substance density, too, are important measurement variables if a substance composition should be examined. There likewise is a number of different known measurement appliances for measuring the substance density. Within certain limits, the substance density likewise can be determined by Lamb wave sensors. However, a disadvantage of the available Lamb wave sensors lies in their comparatively large size, as a result of which the access to many fields of applications is difficult.

SUMMARY

It is therefore an object of the invention to provide a method that is improved in this respect and an apparatus that is improved in this respect for the purposes of determining physical, chemical and/or biological properties of a medium.

This object is achieved both by a method with features as described herein and by an apparatus with features as described herein.

According to the invention, a method for determining physical, chemical and/or biological properties of a medium situated in the interior of a waveguide with the aid of at least one acoustic wave is proposed, in particular, said wave having propagated at least in part through the medium. Here, provision is made a. for at least one surface wave to be excited by means of a transmitter at an outer surface of a first wall portion of the waveguide that bounds the interior, said surface wave propagating at the first wall portion along a first propagation direction,
b. for the at least one surface wave to excite an acoustic wave propagating in the medium at an inner surface of the first wall portion facing the medium, the propagation direction of said acoustic wave comprising a directional component pointing away from the first wall portion,
c. for the acoustic wave propagating in the medium to at least partly couple into an inner surface of a second wall portion of the waveguide, lying opposite the first wall portion, as a second surface wave, which propagates at the second wall portion along a second propagation direction,
d. for physical, chemical and/or biological properties of the medium to be determined on the basis of the received surface waves, which can be at least partly traced back to the acoustic waves which have propagated in the medium,
e. for the first wall portion and the second wall portion to be connected to one another by way of a connecting piece of the waveguide in such a way that a second surface wave propagates at least in part over the connecting piece to the first wall portion,
f. for at least one reflective element to be provided at one of the wall portions and/or at the connecting piece, at least part of the at least one first surface wave being reflected at said reflective element as a third surface wave, and
g. for second and third surface waves, on the basis of which physical, chemical and/or biological properties of the medium are determined, to be received by means of a receiver at the first wall portion.

The excited surface waves are preferably Lamb waves or waves in the transition region between Rayleigh waves and Lamb waves.

In one exemplary embodiment, the first and second wall portions are embodied as plane plate portions.

In particular, the first and second wall portions can have an integral embodiment with the connecting piece in this case.

For an interference-free propagation in the direction of the first wall portion beyond the connecting piece, the connecting piece, in one embodiment, curves outward in a convex form in relation to the interior that receives the medium. By way of example, a radius of curvature of the connecting piece in this case corresponds to approximately 1.5-times the wall thickness of the first and/or second wall portion, or it is greater than 1.5-times the wall thickness.

In principle, the medium to be characterized can be present in a very small analysis volume. In one variant, the medium is situated in the pipe. However, it can also be situated in a beaker, an oil sump or a tank, for example.

Within the scope of the solution according to the invention, provision can be made, in particular, for the transmitter and the receiver to be provided by a single transmitter-receiver unit, which is selectively operable as a transmitter or receiver. On account of the reflected surface wave and the second surface wave propagating via the connecting piece to the first wall portion and, preferably, to the transmitter, surface waves arrive at the location of the transmitter which have propagated along different propagation paths and at least also in part in this case as an acoustic wave, usually in the form of volume acoustic waves through the medium to be characterized. In this way, it is possible to determine physical, chemical and/or biological properties of the medium using a single transmitter-receiver unit.

In one variant, the first wall portion, the second wall portion and the connecting piece together define a U-shaped cross section of the waveguide in at least one region of the interior. In this variant, provision can be made for the interior to be closed by separate closure part at a side lying opposite to the connecting piece. By way of example, the waveguide is consequently formed in a U-shaped manner with the first and second wall portions formed integrally with one another and the connecting piece such that the first and second wall portions define the limbs of the U-shape protruding from the connecting piece as a base, and the open side of the U-shape is closed by a separate closure part.

The separate closure part can be inserted into the interior, in which the medium to be determined is situated, with at least one portion. In this way, the closure part can close off the interior by way of the inserted portion. In one variant, the closure part has two (closure) portions, wherein the interior is closed off by the one portion and the other portion closes off a housing part receiving the waveguide, the closure part being stuck at the open side of said housing part. Here, the waveguide can be arranged in a cavity of the housing part of the apparatus. In one variant, this cavity is filled or cast with a material with an acoustic impedance of less than 150 000 Rayl (with 1 Rayl=1 $kg/m^2s$ in the MKS system of units).

At the closure part can further also serve as a carrier for the transmitter and/or the receiver. Consequently, the transmitter and/or the receiver can be arranged in a preassembled manner at the closure part and can be positioned as intended on the waveguide and/or on the housing part by way of sticking on the closure part.

In one embodiment variant, at least part of an electronic evaluation device is arranged at the closure part, said electronic evaluation device being used to evaluate, for the purposes of determining the physical, chemical and/or biological properties of the medium, the reception signals produced by the receiver upon receiving surface waves.

Here, the electronic evaluation device can likewise be pre-assembled on the closure part such that said evaluation device forms a functional and testable component on the closure part, which can be subsequently assembled on the waveguide.

Alternatively, or in a complementary manner, at least part of a temperature sensor system can be arranged at the closure part, a temperature of the medium and/or of an exterior surrounding the waveguide being determined by means of said temperature sensor system. Measurement signals in such a temperature sensor system then can be used directly for the purposes of determining the physical, chemical and/or biological properties of the medium when evaluating the reception signals produced upon reception of surface waves.

In order to arrange at least one electronic component, such as a component of an electronic evaluation device and/or a component of the temperature sensor system, for example, at the closure part in a manner protected from external influences, in particular liquids and/or gases, the at least one electronic component can be at least partly received in a potting compound.

In one embodiment variant, the reflective element comprises an open cut-out or a cut-out filled with a filler material in the first wall portion, the second wall portion and/or in the connecting piece. Consequently, the cut-out can be provided, in particular, only at one of the wall portions or only at the connecting piece, or else it can extend both at a wall portion and also at the connecting piece. In particular, the cut-out can be embodied as a notch, in particular a wedge-shaped notch. However, the wall thickness of the respective wall portion and/or of the connecting piece is locally reduced at a notch in order to achieve reflections of incident surface waves thereon, said waves propagating at the wall portion or the connecting piece.

The filler material of the cut-out can be a material with a particularly high or low acoustic impedance, for example a plastics material with a tungsten, tungsten carbide or glass hollow sphere filler.

Instead of a notch, provision can also be made of an alternatively designed reflective element, for example a local thickening at the first or second wall portion and/or at the connecting piece. In one embodiment variant, the thickening extends, e.g., parallel to the propagation direction of the surface waves with a length that corresponds to at least half the wavelength. By way of example, the length of the thickening is greater than the wall thickness of the first or second wall portion and/or at the connecting piece, at which said thickening is provided, but it is less than or equal to four times the wall thickness.

Independently of the configuration of the reflective element, the latter is provided at one of the first and second wall portions in the vicinity of the connecting piece in one embodiment variant. Consequently, the reflective element is provided at the short distance from the connecting piece, for example at a distance that is less than ¼ of the distance at which the transmitter is arranged from the connecting piece. By way of example, the reflective element is provided in a region in which a convex, outward curve of the connecting piece transitions into an outer surface of the first or second wall portion that extends along a straight line.

In one embodiment variant, the distance a between the reflective element and the transmitter is set in a fashion optimized by measurement technology. What is set here, for example, is that the following applies to the distance a:

$$a > 0.5 T_{min} c_{Ph} + b \left( 1.8 + 0.5 \sqrt{ 3.5 \left( \frac{c_{F,max}}{c_{F,min}} \right)^2 - 1 } \right).$$

Here, the parameter $c_{Ph}$ denotes the wave phase speed on a wall portion, $c_{F,max}$ denotes the fastest sound speed to be measured in the medium (i.e., the maximum sound speed that the measurement apparatus should be able to measure during operation or the sound speed that can be measured by means of the measurement apparatus), $c_{F,min}$ denotes the slowest sound speed to be measured in the medium, b denotes the clear distance between the mutually opposite wall portions and $T_{min}$ denotes a minimum time between two successive signal echoes, predetermined by an electronic evaluation unit, which minimum time must have elapsed so that signals received at the receiver can be temporally resolved in the evaluation electronics. Consequently, defined structural prescriptions can be provided for the waveguide, for example in order to ensure the functionality thereof with the desired measurement accuracy, by way of the formula specified above and the parameters contained therein, which are or have been predetermined for the measurement apparatus.

In principle, the medium can flow in the interior from an inlet of the waveguide to an outlet of the waveguide along a flow direction, wherein the first propagation direction of produced surface waves then extends at an angle, in particular perpendicular, to the flow direction.

In one embodiment variant, the transmitter and the receiver are provided by a single transmitter-receiver unit, which is selectively operable as a transmitter or a receiver. In this way, it is possible to reduce costs and assembly outlay as it is only the transmitter-receiver unit that has to be assembled.

The first wall portion, the second wall portion and/or the connecting piece are produced from metal, a plastics material, in particular a weakly damping plastics material, or a ceramic.

Furthermore, an apparatus for determining physical, chemical and/or biological properties of the medium is proposed, comprising an acoustic waveguide, which has an interior to be filled by the medium, a transmitter, by means of which at least one first surface wave is excited on an outer surface of a first wall portion of the waveguide bounding the interior, said surface wave propagating at the first wall portion along a first propagation direction and exciting an acoustic wave propagating in the medium at an inner surface of the first wall portion facing the medium, the propagation direction of said acoustic wave comprising a directional component pointing away from the first wall portion, wherein the waveguide is embodied and configured in such a way that the acoustic wave propagating in the medium at least partly couples into an inner surface of a second wall portion of the waveguide, lying opposite the first wall portion, as a second surface wave, which propagates at the second wall portion along a second propagation direction, and an electronic evaluation unit, by means of which physical, chemical and/or biological properties of the medium are determined on the basis of received surface waves, which can be at least partly traced back to the acoustic waves which have propagated in the medium.

Here, additional provision is made for the first wall portion and the second wall portion to be connected to one another by way of the connecting piece of the waveguide in such a way that a second surface wave propagates at least in part over the connecting piece to the first wall portion, for at least one reflective element to be provided at one of the wall portions and/or at the connecting piece, at least part of the at least one first surface wave being reflected at said reflective element as a third surface wave, and for second and third surface waves, on the basis of which physical, chemical and/or biological properties of the medium are determined by means of the evaluation device coupled to the receiver, to be received by means of a receiver at the first wall portion.

Here, in particular, the proposed method can be carried out by means of the proposed apparatus, and so advantages and features of embodiments and variants of the method, explained above and below, also apply to embodiment variants of the apparatus, and vice versa.

BRIEF DESCRIPTION OF THE DRAWINGS

The attached figures elucidate a possible exemplary embodiment of the proposed solution in an exemplary manner.

FIGS. 1A and 1B show a longitudinal and cross-sectional view of an exemplary embodiment of the proposed measurement apparatus for carrying out an embodiment variant of the proposed method.

DETAILED DESCRIPTION

FIGS. 1a and 1b show a possible exemplary embodiment of a (measurement) apparatus 1, by means of which a variant of the proposed method can be carried out.

The measurement apparatus 1 illustrated here has a housing part 2 with a cavity 20, in which a waveguide 3 is housed. The waveguide 3 surrounds an interior 30 with an inlet E and an outlet A. Proceeding from the inlet E, a medium M can flow through the interior 30 along the direction of extent y in the direction of the outlet A.

In the cross section, the waveguide 3 has two plate-shaped wall portions 31a and 31b that lie opposite one another transversely to the direction of extent y, bound the interior 30 with their inner surfaces 310 and are connected to one another by way of a connecting piece 31c.

At the first wall portion 31a, a transmitter-receiver unit SE for exciting first surface waves OW1 is arranged at an outer surface 311 facing away from the interior 30. These surface waves OW1 propagate at the first wall portion 31a perpendicular to the direction of extent y in the −x direction and partly couple volume acoustic waves VW1 into the medium M. These volume acoustic waves VW1 in turn partly couple second surface waves OW2 at the opposite wall portion 31b. These second surface waves OW2 likewise propagate in the −x direction and therefore back to the transmitter-receiver unit SE via the connecting piece 31c.

A reflective element in the form of a notch 4, which also can be filled with a material, is provided at the first wall portion 31a in the region of the transition to the connecting piece 31c. The first surface waves OW1 are reflected at this notch 4 such that reflected surface waves OW1' propagate back to the transmitter-receiver unit SE in the opposite direction +x. Consequently, different surface waves OW2 and OW1 can be captured by means of a single transmitter-receiver unit SE. By virtue of the surface waves OW2 in this case tracing back to volume acoustic waves VW1, which have propagated through the medium M, this renders it possible to determine physical and/or chemical and/or biological properties of the medium M.

At the side of the interior 30 lying opposite the connecting piece 31c, said interior is closed off by a closure part 5. To this end, the closure part 5 has a shaft portion 50 that is affixed to an open side of the housing part 2. By way of a protruding connecting head 51 of the shaft portion 50, the closure part 5 is inserted into the housing part 2 and, by a closure portion 520 of the shaft portion 50, said closure part inserted into the interior 30. An open side of the housing part 2 is closed off by way of the inserted connecting head 51 of the closure part 5 (which defines a closure portion), the interior 30, in turn, being closed off and sealed to the outside by way of the (interior) closer portion 520 inserted into the interior 30.

An evaluation device AS is arranged at the closure part 5 at a holder 52 that is connected to the shaft portion 50, said evaluation device being used to evaluate reception signals produced upon reception of the surface waves OW2, OW1' for the purposes of determining the physical and/or chemical and/or biological properties of the medium M. A temperature sensor system T is also arranged at the closure part 5, said temperature sensor system being used to determine a temperature of the medium M and/or of an exterior surrounding the waveguide 3. Here, the electronic components of the evaluation device AS and of the temperature sensor system T that are arranged at the closure part 5 are received in a potting compound.

Together with the connecting piece 31c, the first and second wall portions 31a, 31b form a bent plate that is preferably made of metal or else ceramic or else weakly damping plastics, said plate surrounding the medium M to be characterized, e.g. a fluid, at least in a small region. The Lamb wave is excited by a piezo-ceramic of the transmitter-receiver unit SE (interdigital transducer or wedge transducer) on the plate at the first wall portion 31a. By way of a notch 4 that has been introduced in a targeted manner on the wave-guiding plate, said Lamb waves return to the originally transmitting element, the transmitter-receiver unit SE, as a reflection. Additionally, part of the wave reaches the opposite second wall portion 31b of the plate through the enclosed fluid volume as a leaky wave, the wave being once again input coupled there and likewise reaching the transmitter-receiver unit SE with time offset via the connecting piece 31c and past the notch 4 as a Lamb wave, following the reflection. As a consequence, two signal packets can be detected after switching the transmission element over into the reciprocal reception mode, the time of flight and time-of-flight difference being used predominantly for determining the sound speed, the amplitude ratio being used to calculate the substance density and the time of flight of the first wave packet (first reflection) being used to measure the temperature.

The notch 4 is just so deep and wide that a uniform ratio between Lamb wave transmission and reflection is achieved under all conditions. In the present case, the notch 4 has a wedge shape in cross section. However, an alternatively embodied cut-out also can be provided as a reflection element in place of the notch 4. By way of example, a cylindrical cut-out can be provided. Here, the cylinder axis of such a cylindrical cut-out can extend parallel or perpendicular to the propagation direction +/−x of the surface waves OW1, OW1'.

In the present case, the notch is formed on the first wall portion 31a, at which the transmitting transmitter-receiver unit SE is arranged. Here, the notch 4 is formed on the outer surface of 311 facing away from the medium M, to be precise at a distance from the transmitter-receiver unit SE in a region in the vicinity of the connecting piece 31c. In the variant depicted in FIG. 1B, the notch 4, which is embodied as local tapering of the wall portion 31a such that the wall thickness d of the wall portion 31a (or of the plate) is locally reduced, extends, in particular, along the second propagation direction +x into a region in which the convex, outward curve of the connecting piece 31c transitions into the outer surface 311 of the first wall portion 31a that extends along a straight line.

Further, a distance a of the notch 4 (or an alternative reflection element) from the transmitting transmitter-receiver unit SE is selected in such a way that the following condition is satisfied:

$$a > 0.5 T_{min} c_{Ph} + b\left(1.8 + 0.5\sqrt{3.5\left(\frac{c_{F,max}}{c_{F,min}}\right)^2 - 1}\right).$$

Here, $c_{Ph}$ denotes the wave phase speed on a wall portion 31a, 31b, $c_{F,max}$ denotes the fastest sound speed to be measured, $c_{F,min}$ denotes the slowest sound speed to be measured, b denotes the clear distance between the presently plane, mutually opposite wall or waveguide portions 31a and 31b and $T_{min}$ denotes the minimum time between two successive signal echoes that must have elapsed so that received signals can be temporally resolved in the evaluation electronics AS.

As already specified above, the notch 4 also can be filled partly or completely with a (filler) material in one development for a targeted influence on the reflection. Here, the filler material can be a material with a particularly high or low acoustic impedance, for example a plastics material with a tungsten, tungsten carbide or glass hollow sphere filler.

An alternatively configured reflective element also can be provided in place of the notch 4, for example a local thickening 4* at the first or second wall portion 31a, 31a and/or the connecting piece 31c. A possible variant of the reflective element in the form of a thickening 4* is illustrated by dashed lines in FIG. 1B. By way of this thickening 4* provided at the position of the notch 4, the wall thickness d of the first wall portion 31a is increased, at least doubled in the present case, near the connecting piece 31c. Here, the thickening 4* extends parallel to the propagation direction +/−x of the surface waves OW1, OW1' with a length that only makes up a fraction of the overall length of the wall portion 31a. Here, the length should correspond to at least half the wavelength. By way of example, the length of the thickening 4* lies in the range of >1 d and ≤4 d.

The bent plate is protected by the housing part 2 and the closure part 5 in such a way that, in the region of the sound propagation, air or medium with a very low sound impedance surrounds the rear side (i.e., the outer surface 311 not facing the medium M) of the bent plate. Moreover, further elements (hatched regions of the closure part 5), in particular the shaft portion 50, ensure that electronics and piezo-ceramics can be cast without impairing the sound-guiding elements.

LIST OF REFERENCE SIGNS 1 (Measurement) apparatus
2 Housing part
20 Cavity
3 Waveguide 30 Interior
310 Inner surface
311 Outer surface
31a, 31b Plate/wall portion
31c Curved connecting piece
4 Notch (reflective element)
4* Thickening (reflective element)
5 Closure part
50 Shaft portion
51 Connecting head
52 Holder
520 Closure portion
A Outlet
a, b Distance
AS Evaluation device (with evaluation/control electronics)
D Wall thickness
E Inlet
M Medium
OW1, OW2 Surface wave
SE Transducer (transmitter-receiver unit)
T Temperature sensor system
VW1 Volume acoustic wave

The invention claimed is:

1. A method for determining at least one of physical, chemical and biological properties of a medium situated in an interior of a waveguide with the aid of at least one acoustic wave which has propagated at least in part through the medium, wherein:
at least one surface wave is excited by means of a transmitter at an outer surface of a first wall portion of the waveguide that bounds the interior, said surface wave propagating at the first wall portion along a first propagation direction,
the at least one surface wave excites an acoustic wave propagating in the medium at an inner surface of the first wall portion facing the medium, the propagation direction of said acoustic wave comprising a directional component pointing away from the first wall portion,
the acoustic wave propagating in the medium at least partly couples into an inner surface of a second wall portion of the waveguide, lying opposite the first wall portion, as a second surface wave, which propagates at the second wall portion along a second propagation direction,
at least one of physical, chemical and biological properties of the medium are determined on the basis of the received surface waves, which can be at least partly traced back to the acoustic waves which have propagated in the medium,
the first wall portion and the second wall portion are connected to one another by way of a connecting piece of the waveguide in such a way that a second surface wave propagates at least in part over the connecting piece to the first wall portion,
at least one reflective element is provided at one of the wall portions and/or at the connecting piece, at least part of the at least one first surface wave being reflected at said reflective element as a third surface wave,
second and third surface waves, on the basis of which at least one of physical, chemical and biological properties of the medium are determined, are received by means of a receiver at the first wall portion, and
the interior is closed by separate closure part at a side lying opposite to the connecting piece.

2. The method as claimed in claim 1, wherein the first and second wall portions are embodied as plane plate portions.

3. The method as claimed in claim 1, wherein the first and second wall portions have an integral embodiment with the connecting piece.

4. The method as claimed in claim 1, wherein the connecting piece curves outward in a convex form in relation to the interior that receives the medium.

5. The method as claimed in claim 1, wherein the first wall portion, the second wall portion and the connecting piece together define a U-shaped cross section of the waveguide in at least one region of the interior.

6. The method as claimed in claim 1, wherein the separate closure part is inserted into the interior with at least one portion.

7. The method as claimed in claim 1, wherein the transmitter and/or the receiver is arranged at the closure part.

8. The method as claimed in claim 1, wherein at least part of an evaluation device is arranged at the closure part, reception signals produced by the receiver upon the reception of surface waves being evaluated by said evaluation device for the purposes of determining at least one of the physical, chemical and biological properties of the medium.

9. The method as claimed in claim 1, wherein at least part of a temperature sensor system is arranged at the closure part, a temperature of the medium and/or of an exterior surrounding the waveguide being determined by means of said temperature sensor system.

10. The method as claimed in claim 1, wherein at least one electronic component is at least partly received in a potting compound on the closure part.

11. The method as claimed in claim 1, wherein the reflective element comprises an open cut-out or a cut-out filled with a filler material, in particular a notch, in the first wall portion, the second wall portion and/or in the connecting piece.

12. The method as claimed in claim 1, wherein the reflective element is provided at one of the first and second wall portions in the vicinity of the connecting piece.

13. The method as claimed in claim 12, wherein that the reflective element is provided in a region in which a convex, outward curve of the connecting piece transitions into an outer surface of the first or second wall portion that extends along a straight line.

14. The method as claimed in claim 1, the reflective element is arranged at a distance a from the transmitter, such that the following applies to the distance a:

$$a > 0.5 T_{min} c_{Ph} + b\left(1.8 + 0.5\sqrt{3.5\left(\frac{c_{F,max}}{c_{F,min}}\right)^2 - 1}\right),$$

where $c_{Ph}$ denotes the wave phase speed on a wall portion, $c_{F,max}$ denotes the fastest sound speed to be measured in the medium, $c_{F,min}$ denotes the slowest sound speed to be measured in the medium, b denotes the clear distance between the mutually opposite wall portions and $T_{min}$ denotes a minimum time between two successive signal echoes, predetermined by an electronic evaluation unit, which minimum time must have elapsed so that signals received at the receiver can be temporally resolved in the evaluation electronics.

15. The method as claimed in claim 1, wherein the transmitter and/or the receiver are formed by a transducer, in particular an interdigital transducer or a wedge transducer.

16. A method for determining at least one of physical, chemical and biological properties of a medium situated in an interior of a waveguide with the aid of at least one acoustic wave which has propagated at least in part through the medium, wherein:

at least one surface wave is excited by means of a transmitter at an outer surface of a first wall portion of the waveguide that bounds the interior, said surface wave propagating at the first wall portion along a first propagation direction, the at least one surface wave excites an acoustic wave propagating in the medium at an inner surface of the first wall portion facing the medium, the propagation direction of said acoustic wave comprising a directional component pointing away from the first wall portion, the acoustic wave propagating in the medium at least partly couples into an inner surface of a second wall portion of the waveguide, lying opposite the first wall portion, as a second surface wave, which propagates at the second wall portion along a second propagation direction, at least one of physical, chemical and biological properties of the medium are determined on the basis of the received surface waves, which can be at least partly traced back to the acoustic waves which have propagated in the medium, the first wall portion and the second wall portion are connected to one another by way of a connecting piece of the waveguide in such a way that a second surface wave propagates at least in part over the connecting piece to the first wall portion, at least one reflective element is provided at one of the wall portions and/or at the connecting piece, at least part of the at least one first surface wave being reflected at said reflective element as a third surface wave, second and third surface waves, on the basis of which at least one of physical, chemical and biological properties of the medium are determined, are received by means of a receiver at the first wall portion, and the medium can flow in the interior from an inlet of the waveguide to an outlet of the waveguide along a flow direction and the first propagation direction extends at an angle, in particular perpendicular, to the flow direction.

17. A method for determining at least one of physical, chemical and biological properties of a medium situated in an interior of a waveguide with the aid of at least one acoustic wave which has propagated at least in part through the medium, wherein:

at least one surface wave is excited by means of a transmitter at an outer surface of a first wall portion of the waveguide that bounds the interior, said surface wave propagating at the first wall portion along a first propagation direction, the at least one surface wave excites an acoustic wave propagating in the medium at an inner surface of the first wall portion facing the medium, the propagation direction of said acoustic wave comprising a directional component pointing away from the first wall portion, the acoustic wave propagating in the medium at least partly couples into an inner surface of a second wall portion of the waveguide, lying opposite the first wall portion, as a second surface wave, which propagates at the second wall portion along a second propagation direction, at least one of physical, chemical and biological properties of the medium are determined on the basis of the received surface waves, which can be at least partly traced back to the acoustic waves which have propagated in the medium, the first wall portion and the second wall portion are connected to one another by way of a connecting piece of the waveguide in such a way that a second surface wave propagates at least in part over the connecting piece to the first wall portion, at least one reflective element is provided at one of the wall portions and/or at the connecting piece, at least part of the at least one first surface wave being reflected at said reflective element as a third surface wave, second and third surface waves, on the basis of which at least one of physical, chemical and biological properties of the medium are determined, are received by means of a receiver at the first wall portion, and the waveguide is arranged in a cavity of a housing part of the apparatus.

18. The method as claimed in claim 17, wherein the cavity is filled or cast with a material of low acoustic impedance, in particular of less than 150 000 Rayl (with 1 Rayl=1 $kg/m^2s$ in the MKS system of units).

19. An apparatus for determining at least one of physical, chemical and biological properties of a medium, comprising:

an acoustic waveguide, which has an interior to be filled by the medium, a transmitter, by means of which at least one first surface wave is excited on an outer surface of a first wall portion of the waveguide bounding the interior, said surface wave propagating at the first wall portion along a first propagation direction and exciting an acoustic wave propagating in the medium at an inner surface of the first wall portion facing the medium, the propagation direction of said acoustic wave comprising a directional component pointing away from the first wall portion, wherein the waveguide is embodied and configured in such a way that the acoustic wave propagating in the medium at least partly couples into an inner surface of a second wall portion of the waveguide, lying opposite the first wall portion, as a second surface wave, which propagates at the second wall portion along a second propagation direction, and an electronic evaluation unit, by means of which at least one of physical, chemical and biological properties of the medium are determined on the basis of received surface waves, which can be at least partly traced back to the acoustic waves which have propagated in the medium, wherein:

the first wall portion and the second wall portion are connected to one another by way of the connecting piece of the waveguide in such a way that a second surface wave propagates at least in part over the connecting piece to the first wall portion, at least one reflective element is provided at one of the wall portions and/or at the connecting piece, at least part of the at least one first surface wave being reflected at said reflective element as a third surface wave, second and third surface waves, on the basis of which at least one of physical, chemical and biological properties of the medium are determined by means of the evaluation device coupled to the receiver, are received by means of a receiver at the first wall portion, and the interior is closed by separate closure part at a side lying opposite to the connecting piece.

20. An apparatus for determining at least one of physical, chemical and biological properties of a medium, comprising:

an acoustic waveguide, which has an interior to be filled by the medium, a transmitter, by means of which at least one first surface wave is excited on an outer surface of a first wall portion of the waveguide bounding the interior, said surface wave propagating at the first wall portion along a first propagation direction and exciting an acoustic wave propagating in the medium at an inner surface of the first wall portion facing the medium, the propagation direction of said acoustic wave comprising a directional component pointing away from the first wall portion, wherein the waveguide is embodied and configured in such a way that the acoustic wave propagating in the medium at least partly couples into an inner surface of a second wall portion of the waveguide, lying opposite the first wall portion, as a second surface wave, which propagates at the second wall portion along a second propagation direction, and an electronic evaluation unit, by means of which at least one of physical, chemical and biological properties of the medium are determined on the basis of received surface waves, which can be at least partly traced back to the acoustic waves which have propagated in the medium, wherein:
the first wall portion and the second wall portion are connected to one another by way of the connecting piece of the waveguide in such a way that a second surface wave propagates at least in part over the connecting piece to the first wall portion, at least one reflective element is provided at one of the wall portions and/or at the connecting piece, at least part of the at least one first surface wave being reflected at said reflective element as a third surface wave, second and third surface waves, on the basis of which at least one of physical, chemical and biological properties of the medium are determined by means of the evaluation device coupled to the receiver, are received by means of a receiver at the first wall portion, and the medium can flow in the interior from an inlet of the waveguide to an outlet of the waveguide along a flow direction and the first propagation direction extends at an angle, in particular perpendicular, to the flow direction.

21. An apparatus for determining at least one of physical, chemical and biological properties of a medium, comprising:

an acoustic waveguide, which has an interior to be filled by the medium, a transmitter, by means of which at least one first surface wave is excited on an outer surface of a first wall portion of the waveguide bounding the interior, said surface wave propagating at the first wall portion along a first propagation direction and exciting an acoustic wave propagating in the medium at an inner surface of the first wall portion facing the medium, the propagation direction of said acoustic wave comprising a directional component pointing away from the first wall portion, wherein the waveguide is embodied and configured in such a way that the acoustic wave propagating in the medium at least partly couples into an inner surface of a second wall portion of the waveguide, lying opposite the first wall portion, as a second surface wave, which propagates at the second wall portion along a second propagation direction, and an electronic evaluation unit, by means of which at least one of physical, chemical and biological properties of the medium are determined on the basis of received surface waves, which can be at least partly traced back to the acoustic waves which have propagated in the medium, wherein:
the first wall portion and the second wall portion are connected to one another by way of the connecting piece of the waveguide in such a way that a second surface wave propagates at least in part over the connecting piece to the first wall portion, at least one reflective element is provided at one of the wall portions and/or at the connecting piece, at least part of the at least one first surface wave being reflected at said reflective element as a third surface wave, second and third surface waves, on the basis of which at least one of physical, chemical and biological properties of the medium are determined by means of the evaluation device coupled to the receiver, are received by means of a receiver at the first wall portion, and the waveguide is arranged in a cavity of a housing part of the apparatus.

* * * * *